US009641716B2

(12) United States Patent
Obata

(10) Patent No.: US 9,641,716 B2
(45) Date of Patent: May 2, 2017

(54) IMAGE FORMING APPARATUS AND IMAGE FORMING METHOD FOR BOTH SIDE COPYING

(71) Applicants: Kabushiki Kaisha Toshiba, Tokyo (JP); Toshiba Tec Kabushiki Kaisha, Tokyo (JP)

(72) Inventor: Satoshi Obata, Numazu Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/796,982

(22) Filed: Jul. 10, 2015

(65) Prior Publication Data

US 2017/0013158 A1 Jan. 12, 2017

(51) Int. Cl.
G06K 15/02 (2006.01)
H04N 1/04 (2006.01)
H04N 1/00 (2006.01)
G06F 3/12 (2006.01)

(52) U.S. Cl.
CPC ......... *H04N 1/0432* (2013.01); *G06F 3/1252* (2013.01); *G06F 3/1267* (2013.01); *G06F 3/1284* (2013.01); *H04N 1/00748* (2013.01); *H04N 2201/0094* (2013.01)

(58) Field of Classification Search
CPC combination set(s) only.
See application file for complete search history.

(56) References Cited

U.S. PATENT DOCUMENTS

| 2006/0268361 | A1* | 11/2006 | Krolczyk | H04N 1/00432 358/450 |
| 2009/0009825 | A1* | 1/2009 | Honda | H04N 1/3878 358/488 |
| 2013/0293917 | A1* | 11/2013 | Safonov | H04N 1/00413 358/1.13 |

FOREIGN PATENT DOCUMENTS

| JP | 1996-046786 | 2/1996 |
| JP | 1996-139905 | 5/1996 |

* cited by examiner

*Primary Examiner* — Henok A Shiferaw
(74) *Attorney, Agent, or Firm* — Patterson & Sheridan, LLP

(57) ABSTRACT

An image forming apparatus includes an image reading that reads an original document. An image processing unit determines a region other than a first document region corresponding to the first surface of the original document. The region other than the first document region is eliminated from first image data. A region other than a second document region corresponding to the second surface of the original document is determined. The region other than the second document region from the second image data is eliminated. A printing image is generated. An image forming unit prints the printing image generated by the image processing unit on a single surface of a recording medium.

16 Claims, 5 Drawing Sheets

IMAGE FORMING APPARATUS AND IMAGE FORMING METHOD FOR BOTH SIDE COPYING

FIELD

Embodiments described herein relate generally to an image forming apparatus, an image forming method, and a recording medium.

BACKGROUND

In the related art, an image forming apparatus such as a digital multi-functional peripheral performs printing by putting both sides of the original document together on a single side of one sheet (both side disposition copying). As an example of the both side disposition copying, there is a function referred to as card copying. In card copying, both sides of the original document in a card shape such as an ID card are copied on a single side of one sheet. In card copying in the related art, there are two methods as described below. In the first method, an image including the front surface of the original document is copied on the upper half portion of a sheet, and an image including the rear surface of the original document is copied on the lower half portion of the sheet. In the second method, an image on the front surface of the original document which is read in a size designated by a user is disposed at a center of the upper half portion of a sheet, an image on the rear surface of the original document is disposed at the center of the lower half portion of the sheet, and the images are printed on the sheet. However, in the first method, a user should set the front surface and the rear surface of the original document, respectively, by assuming a half region of the sheet. In addition, in the second method, there is a problem in that a user needs to designate a size of the original document accurately.

DETAILED DESCRIPTION

Embodiments provide an image forming apparatus, an image forming method, and a recording medium which may perform printing by putting images on both sides of the original document together on one side of a recording medium in a simple operation.

An image forming apparatus includes an image reading that reads an original document. An image processing unit determines a region other than a first document region corresponding to the first surface of the original document. The region other than the first document region is eliminated from first image data. A region other than a second document region corresponding to the second surface of the original document is determined. The region other than the second document region from the second image data is eliminated. A printing image is generated. An image forming unit prints the printing image generated by the image processing unit on a single surface of a recording medium.

Hereinafter, embodiments will be described with reference to drawings.

First, a configuration of a digital multi-functional peripheral (MFP) as an image forming apparatus will be described.

Figure 1:
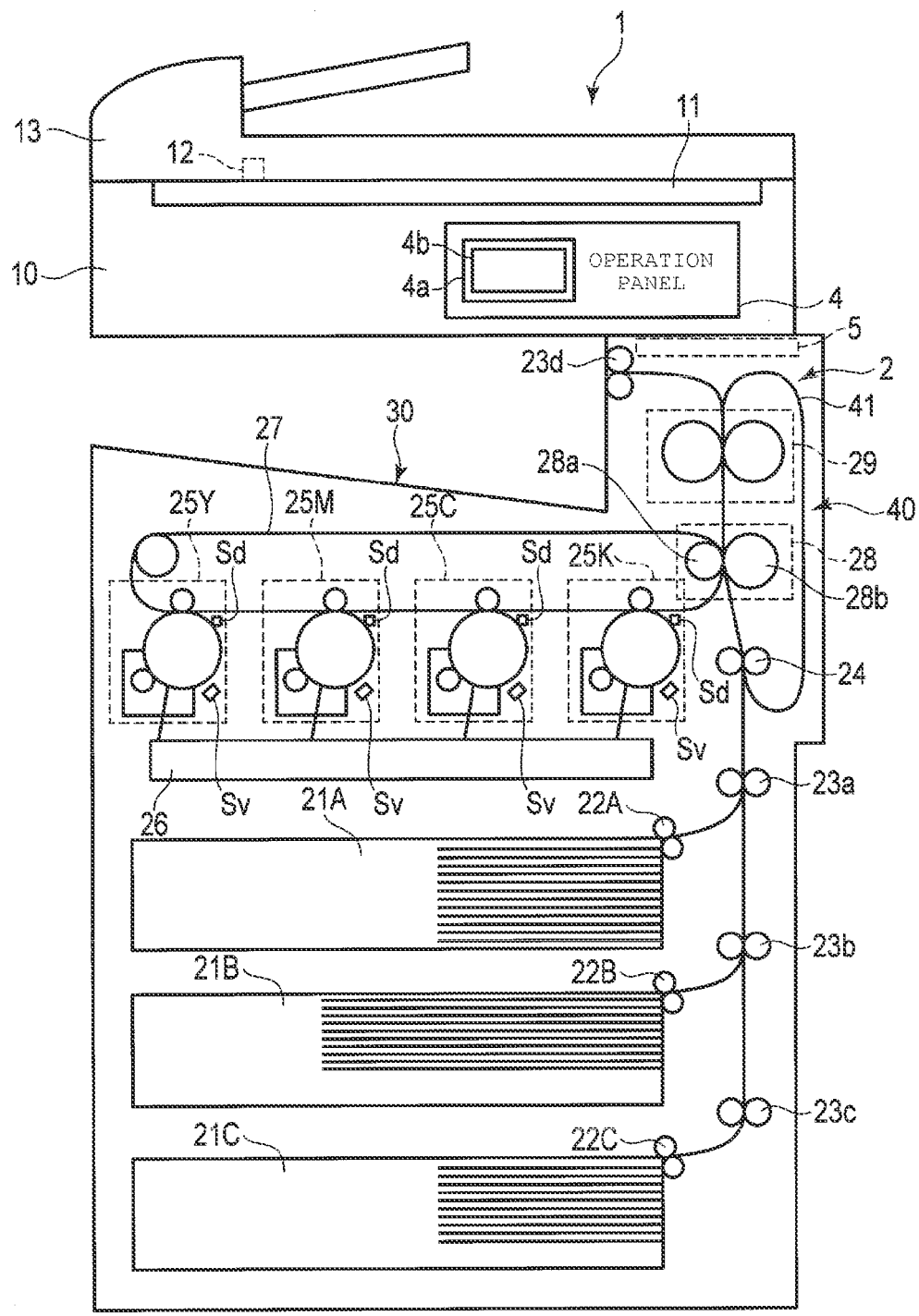
FIG. 1 is a diagram which illustrates an example configuration of a digital multi-functional peripheral according to one embodiment.

FIG. 1 is a cross-sectional view which illustrates an example configuration of the digital multi-functional peripheral. As illustrated in FIG. 1, the digital multi-functional peripheral includes a scanner 1, a printer 2, an operation panel 4, and a system control unit 5.

The scanner 1 reads an image of the original document, and converts the image into image data. The scanner 1 includes an image reading unit 10, original document table glass 11, an opening-closing sensor 12, an auto document feeder (ADF) 13, and the like. For example, the scanner 1 is provided on the upper part of a main body of the digital multi-functional peripheral. The scanner 1 is connected to the system control unit 5. The scanner 1 outputs image data, which is generated by reading an image of the original document, to the system control unit 5.

The image reading unit 10 converts the read image of the original document into the image data. The image reading unit 10 includes a photoelectric conversion unit including a CCD line sensor which converts, line by line in the main scanning direction, an image of the original document into image data. The image reading unit 10 reads an image of the whole original document using the CCD line sensor and scanning the original document in the sub-scanning direction.

The original document is placed on the original document table glass 11 for scanning using the image reading unit 10 is placed. A surface of the original document placed on the original document table glass 11 is the surface to be read. The image reading unit 10 scans the original document on the original document table glass 11 through glass.

The opening-closing sensor 12 detects opening-closing of the ADF 13 which is a platen cover on the original document table glass 11. The opening-closing sensor 12 outputs a signal indicating an opening-closing state of the ADF 13.

The ADF 13 is disposed on the upper part of the original document table glass 11 in a state in which the ADF may be open or closed. A surface of the ADF 13 which comes into contact with the original document table glass 11 becomes a cover (platen cover) with respect to the original document which is placed on the original document table glass 11. For this reason, the surface of the ADF 13 which comes into contact with the original document table glass 11 has uniform luminance (density). In addition, the ADF 13 transports the original document on a sheet feed tray one by one in a closed state. The image reading unit 10 also reads an image of the original document which is transported using the ADF 13.

The image reading unit 10 may read the original document on the original document table glass 11 when the ADF 13 as the platen cover is closed or opened. For example, when reading the original document in a state in which the ADF 13 is open, the image reading unit 10 reads a region other than the original document as a uniform black image with low luminance (high density). In addition, when reading the original document in a state in which the ADF 13 is closed, the image reading unit 10 reads the region other than the original document as a pixel value with uniform luminance (density).

The printer 2 forms an image on a recording medium. The printer 2 is operated according to a control command from the system control unit 5. The printer 2 prints image data which is supplied from the system control unit 5 on a sheet (recording medium).

The printer 2 includes sheet feed cassettes 21A, 21B, and 21C. These sheet feed cassettes 21A, 21B, and 21C accommodate sheets on which images are printed. For example, each of the sheet feed cassettes 21A, 21B, and 21C is detachably provided on the lower part of a main body of the digital multi-functional peripheral. Each of the sheet feed cassettes 21A, 21B, and 21C includes sheet feed rollers 22A, 22B, and 22C, respectively. Each of the sheet feed rollers 22A, 22B, and 22C takes out a sheet one by one from each of the sheet feed cassettes 21A, 21B, and 21C.

The transport unit 23 transports sheets in the printer 2. The transport unit 23 includes a plurality of transport rollers 23a-23f, and a resist roller 24. The transport unit 23 transports the sheet which is taken out using each of the sheet feed rollers 22A, 22B, and 22C to the resist roller 24. The resist roller 24 transports the sheet to a transfer position at an image transfer timing.

A plurality of image forming units 25 (25Y, 25M, 25C, and 25K) respectively form an image of each color (yellow, magenta, cyan, and black). An exposure unit 26 radiates laser light to photosensitive drum D (Dy, Dm, Dc, and Dk) of each image forming unit 25 (25Y, 25M, 25C, and 25K), and forms an electrostatic latent image. The exposure unit 26 radiates laser light which is controlled according to image data to the photosensitive drum D through an optical system such as a polygon mirror. An electrostatic latent image is formed on the surface of the photosensitive drum D which is irradiated with laser light. The exposure unit 26 controls the laser light according to a control signal from the system control unit 5. For example, the exposure unit 26 controls an intensity of the laser light according to the control signal from the system control unit 5. In addition, the exposure unit 26 also controls a modulation amount, or the like, of a pulse width for controlling light emission of laser light according to the control signal from the system control unit 5.

Each of the image forming units 25 (25Y, 25M, 25C, and 25K) forma toner image by developing the respective electrostatic latent images formed on the photosensitive drums D (Dy, Dm, Dc, and Dk) using toner of each color (yellow, magenta, cyan, and black). An intermediate transfer belt 27 is an intermediate transfer body. Each of the image forming units 25 (25Y, 25M, 25C, and 25K) transfers (primary transfer) the toner image of each color which is formed on the photosensitive drums D (Dy, Dm, Dc, and Dk), respectively, onto the intermediate transfer belt 27.

In addition, each image forming unit 25 (25Y, 25M, 25C, and 25K) includes a sensor such as a potential sensor Sv, and a density sensor Sd. The potential sensor Sv detects a surface potential of the photosensitive drum. In each image forming unit 25 (25Y, 25M, 25C, and 25K), a surface of each photosensitive drum D is charged using a charging charger before being exposed using the exposure unit 26. Charging conditions of the charging charger may be changed due to a control signal from the system control unit 5. The potential sensor Sv detects a surface potential in the photosensitive drum after the surface is charged using the charging charger. The density sensor Sd detects density of a toner image which is transferred onto the intermediate transfer belt 27. In addition, the density sensor Sd may be a sensor which detects a toner image which is formed on the photosensitive drums Dy, Dm, Dc, and Dk.

Each of image forming units 25Y, 25M, 25C, and 25K transfers (primary transfer) a toner image which is developed using each color (yellow, magenta, cyan, and black) onto the intermediate transfer belt 27 in an overlapping manner. The intermediate transfer belt 27 maintains a color image in which the toner images of each color are overlapped with each other. The transfer unit 28 transfers the color image on the intermediate transfer belt 27 which is formed using the plurality of colors to a sheet at a secondary transfer position. The secondary transfer position is a position at which the toner image on the intermediate transfer belt 27 is transferred to the sheet. The secondary transfer position is a position at which the support roller 28a and the secondary transfer roller 28b face each other.

The resist roller 24 transports the sheet to the secondary transfer position at transfer timing of the toner image on the intermediate transfer belt 27. After the toner image is transferred to the sheet at the secondary transfer position, the transfer unit 28 supplies the sheet to the fixing unit 29. The fixing unit 29 fixes the toner image onto the sheet by heating the sheet onto which the toner image is transferred using the transfer unit 28 in a pressurizing state. The fixing unit 29 transports (discharges) the sheet which is subjected to the fixing process to either the sheet discharging unit 30 or a double side printing mechanism 40.

The double side printing mechanism 40 reverses the sheet which is subjected to the fixing process using the fixing unit 29, and supplies the sheet to the resist roller 24 again. In addition, the double side printing mechanism 40 maintains the reversed sheet until desired printing timing (rear surface printing timing). The double side printing mechanism 40 includes a reverse transport path 41 which guides the sheet which is subjected to the fixing process to the resist roller 24. The reverse transport path 41 supplies the sheet which is reversed to the resist roller 24 at the desired printing timing.

The operation panel 4 is a user interface. The operation panel 4 includes a display unit 4a and an operation unit 4b. A user inputs information such as setting information using the operation unit 4b of the operation panel 4. The display unit 4a and the operation unit 4b of the operation panel 4 are connected to the system control unit 5. The system control unit 5 controls the display unit 4a and the operation unit 4b of the operation panel 4.

In addition, the printer 2 illustrated in FIG. 1 is an electrophotographic printer. However, the printer 2 according to the embodiment is not limited to the electrophotographic type. For example, the printer 2 which is mounted on the digital multi-functional peripheral according to the embodiment may be a printer other than the electrophotographic type such as an ink jet type or a thermal transfer type.

Subsequently, a configuration of a control system of the digital multi-functional peripheral will be described.

Figure 2:
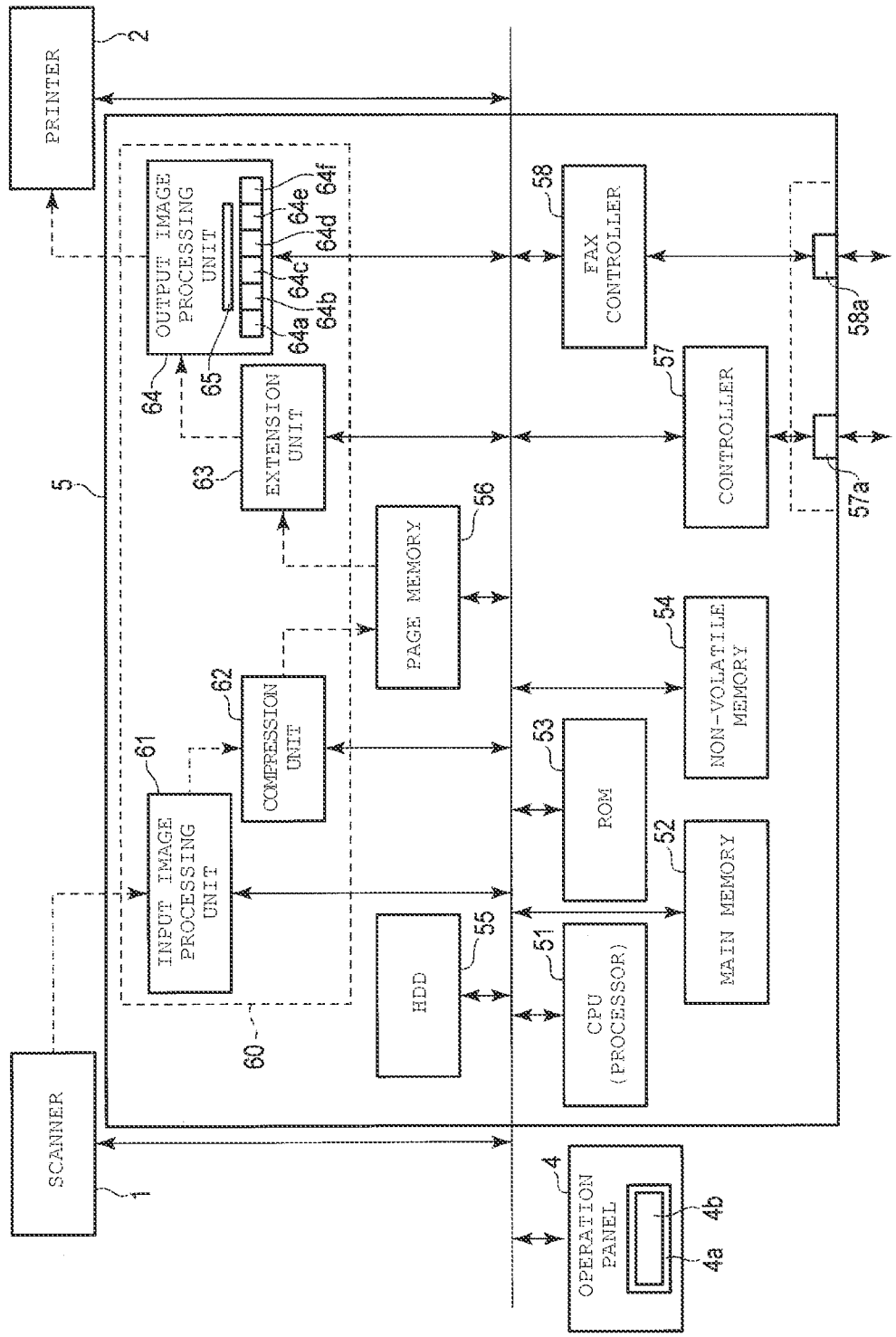
FIG. 2 is a block diagram which illustrates a configuration of a control system of the digital multi-functional peripheral.

FIG. 2 is a block diagram which illustrates a configuration of the control system in the digital multi-functional peripheral.

The digital multi-functional peripheral includes the system control unit 5 which controls the entire apparatus. The system control unit 5 is connected to the scanner 1, the printer 2, and the operation panel 4 through a system bus, or the like.

The system control unit 5 includes a CPU (processor) 51, a main memory 52, a ROM 53, a non-volatile memory 54, an HDD 55, a page memory 56, a printer controller 57, a fax controller 58, interfaces (I/F) 57a and 58a, and an image processing unit 60.

The CPU 51 controls the entire digital multi-functional peripheral. The CPU 51 is a processor which executes processes by executing a program. The CPU 51 is connected to each unit in the apparatus through the system bus. The CPU 51 is also connected to the scanner 1, the printer 2, the operation panel 4, and the like, through the system bus. The CPU 51 outputs an operation instruction to each unit, or obtains various information from each unit through a bidirectional communication with the scanner 1, the printer 2, and the operation panel 4. In addition, the CPU 51 receives information denoting a detection signal, an operation state, and the like, from each sensor which is provided in each unit in the apparatus.

The main memory 52 is a RAM, or the like. The main memory 52 functions as a working memory, or a buffer memory. The ROM 53 is a non-rewritable and non-volatile memory which stores a program, control data, and the like. The CPU 51 executes various processes when executing a program which is stored in the ROM 53 (or non-volatile memory 54 or HDD 55) while using the main memory 52.

The non-volatile memory 54 is a rewritable non-volatile memory. The non-volatile memory 54 stores a control program and control data which are executed by the CPU 51. In addition, the non-volatile memory 54 stores setting information, a processing condition, and the like. The hard disk drive (HDD) 55 is a large capacity storage device. The HDD 55 stores image data, various history information, and the like. In addition, the HDD 55 may store a control program, control data, and the like. In addition, the HDD 55 may store setting information, processing conditions, and the like. The page memory 56 is a memory which develops image data as a processing target. For example, the page memory 56 stores image data which is generated using the scanner 1 after performing image processing.

The network controller 57 controls communication with an external device. The network controller 57 is connected to a network through the interface 57a. The network controller 57 communicates with the external device through a network. For example, the network controller 57 may receive a printing request from the external device or output a scanned image to the external device.

The fax controller 58 controls a fax communication (transceiving of facsimile data). The fax controller 58 performs transceiving of facsimile data through the interface 58a and a public line.

In addition, the system control unit 5 may include an interface to which the external device is locally connected, or an interface to which a storage medium is connected.

The image processing unit 60 includes an input image processing unit 61, a compression unit 62, an extension unit 63, and an output image processing unit 64.

The input image processing unit 61 functions as a scanner system image processing unit which processes the image data generated using the scanner 1. The input image processing unit 61 executes a shading correction process, a grayscale conversion process, an inter-line correction process, or the like, with respect to image data which is generated using the scanner 1.

The shading correction process is a process in which image data is corrected according to an uneven sensitivity of each photoelectric conversion element (such as a CCD), or according to a light distribution property of a lamp that illuminates the original document. The grayscale conversion process is a process in which a value of each pixel (for example, each signal value of R, G, and B) which configures image data is converted according to a lookup table. The inter-line correction process is a process in which a physical position shift of each sensor of RGB in the CCD line sensor of the scanner 1 is corrected. In addition, the input image processing unit 61 may perform a resolution conversion, a magnification process, adjusting of brightness, adjusting of contrast, adjusting of color, adjusting of sharpness, or the like, on the image data obtained by the scanner 1.

The compression unit 62 compresses image data. For example, the compression unit 62 compresses image data which is processed by the input image processing unit 61. The compression unit 62 stores the compressed image data in the page memory 56. In addition, the compression unit 62 may output the compressed image data to the HDD 55, or the like. The extension unit 63 extends the compressed image data. For example, the extension unit 63 reads the compressed image data from the page memory 56, and extends the compressed image data. The extension unit 63 outputs the extended image data to the output image processing unit 64. In addition, the extension unit 63 may output the extended image data to the HDD 55, or the like.

The output image processing unit 64 processes image data for printing. The output image processing unit 64 includes a color conversion unit 64a, a sharpening unit 64b, an original document detection unit 64c, an outside region eliminating unit 64d, a magnification unit 64e, an image editing unit 64f, and the like. In addition, the image memory 65 stores image data which is processed by the output image processing unit 64.

The color conversion unit 64a performs a color conversion process with respect to image data. For example, the color conversion unit 64a converts color image data which is formed of signals of R (red), G (green), and B (blue) into color image data for printing which is formed of signals of C (cyan), M (magenta), Y (yellow), and K (black). The sharpening unit 64b sharpens image data. The sharpening unit 64b sharpens image data by performing image processing such as a filtering process, an inking process, a gamma correction process, or the like.

The original document detection unit 64c detects an image of the original document. The image reading unit 10 scans a set size of the original document as a region for reading. When performing copying, the system control unit 5 normally sets the size of the original document by automatically detecting the size of the original document using a sensor which is disposed in the image reading unit 10. Alternatively, the system control unit 5 sets a size of the original document which is manually designated using the operation unit 4b of the operation panel 4 by a user. On the other hand, when performing special copying such as both side disposition copying (card copying), a size which is fixed in advance is used in the region for reading of the image reading unit 10. For example, the image reading unit 10 scans an A4 size as a region for reading, uniformly.

The original document detection unit 64c detects a region of the original document (hereinafter, referred to as original document region) by detecting a region other than the original document, or an edge of the original document in an image in the region for reading which is read using the image reading unit 10. For example, when the original document on the original document table glass 11 is read in a state in which the ADF 13 as the original document presser is open, the image reading unit 10 reads the region other than the original document as a black image. In this case, the original document detection unit 64c detects the region of the black image as the region other than the original document. In addition, when the original document on the original document table glass 11 is read in the state in which the ADF 13 is closed, the image reading unit 10 reads the edge of the original document as a specific pixel value due to a difference in density between the original document and an original document pressing surface of the ADF 13. In this case, the original document detection unit 64c detects the original document region by detecting the edge portion of the original document.

The outside region eliminating unit 64d eliminates the region other than the original document from the image data. The outside region eliminating unit 64d extracts an image in the original document region. The magnification unit 64e magnifies the image. The magnification unit 64e reduces or enlarges the image using a set magnification rate. The image editing unit 64f edits an image for printing using one or a plurality of images. For example, the image editing unit 64f arranges two images in line as an image for printing on one page. The image editing unit 64f may be a unit which may set a position at which an image is disposed.

Subsequently, a copying function in the digital multi-functional peripheral according to the embodiment will be described.

The digital multi-functional peripheral according to the embodiment has a copying function in which images from both sides of the original document are printed by being disposed on a single side of one recording medium (hereinafter, referred to as both side disposition copying). For example, the digital multi-functional peripheral prints both sides of the original document, such as an ID card, on a single side of a sheet, using both side disposition copying.

In both side disposition copying, the digital multi-functional peripheral according to the embodiment may read the original document which is positioned at an arbitrary position of the original document table glass 11 (arbitrary position in readable region). The image reading unit 10 reads both sides of the original document which is placed at an arbitrary position of the original document table glass 11, respectively. The image processing unit 64 determines a region of the original document and a region other than the original document in the image which is read using the image reading unit 10, using the original document detection unit 64C. The image processing unit 64 eliminates the region other than the original document from the read image using the outside region eliminating unit 64d. In addition, the image processing unit 64 generates an image for printing in which an image from the first surface of the original document in which the region other than the original document is eliminated, and an image from the second surface of the original document in which the region other than the original document is eliminated are disposed at a predetermined position (or position which is designated by a user) of a printing sheet using the image editing unit 64f.

Figure 3:
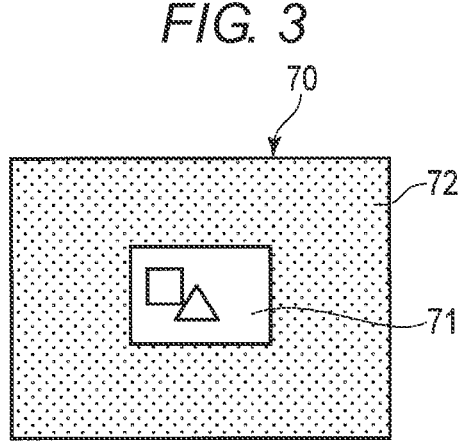
FIG. 3 is an example of a read image which is obtained using a scanner of the digital multi-functional peripheral.
Figure 4:
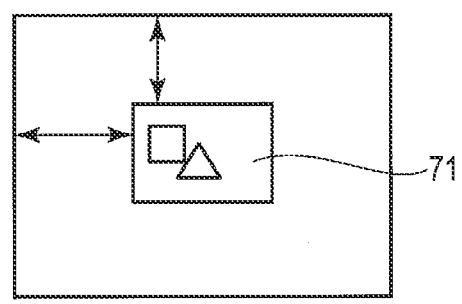
FIG. 4 is an example of an image in which an image in a region other than the original document is eliminated from the read image illustrated in FIG. 3.
Figure 5:
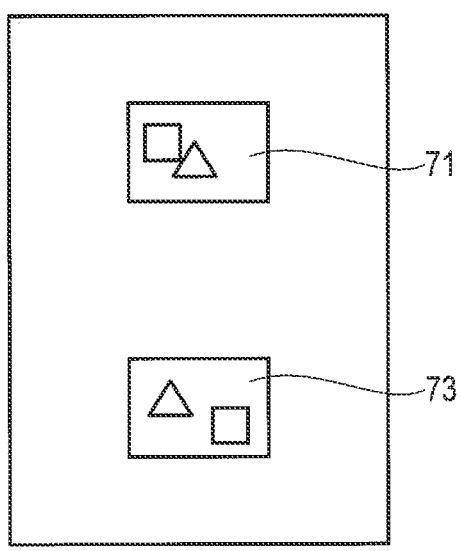
FIG. 5 is a diagram which illustrates an example of a printing image of the front surface image and the rear surface image which are illustrated in FIG. 4.

FIG. 3 is an example of a read image 70 which is obtained by reading the front surface (first face) of the original document using the scanner 1. Specifically, image data of the original document is generated by the scanner 1, and is output. FIG. 4 is an example of an image in which an image 72 in the region other than the original document is eliminated from the read image 70 which is illustrated in FIG. 3. FIG. 5 is a diagram which illustrates an example of a printing image in which the image 71 of front surface of the original document region which is illustrated in FIG. 4, and an image 73 of the rear surface of the original document region are disposed.

The image illustrated in FIG. 3 is an example in which the image is read in a state in which the ADF 13 as the platen cover is open. As illustrated in FIG. 3, the region other than the original document becomes image data with low luminance (high density) in the read image, in a state in which the ADF 13 as the platen cover is open. Accordingly, the image 70 which is read in the state in which the ADF 13 as the platen cover is open has a difference in luminance (density) between the image 71 in the original document region. Accordingly, the image 72 in the region other than the original document is easily determined.

That is, when the read image 70 as illustrated in FIG. 3 is obtained, the original document detection unit 64c detects the image 71 in the original document region and the image 72 in the region other than the original document using a difference in luminance. When the read image 70 as illustrated in FIG. 3 is obtained, the outside region eliminating unit 64d eliminates the image 72 in the region other than the original document as illustrated in FIG. 4. Thus, an image which is formed only of an image R1 from the original document region is generated.

The image processing unit 64 obtains an image 73 from the original document region on the rear surface by performing the same process with respect to a read image on the rear surface (second face) of the original document. After obtaining the image 73 from the original document region on the rear surface, the image editing unit 64f generates a printing image in which the image 71 from the original document region on the front surface and the image 73 from the original document region on the rear surface are disposed, as illustrated in FIG. 5.

In addition, the digital multi-functional peripheral may perform the both side disposition copying by assuming that the original document is read in a state in which the platen cover (ADF 13) is open. In this case, the digital multi-functional peripheral may perform the both side disposition copying in a state in which it is confirmed that the ADF 13 is in an open state using an opening-closing sensor.

However, even when it is the state in which the platen cover (ADF 13) is open, it is possible to detect the original document region by detecting an edge portion of the original document. For this reason, the original document detection unit 64c may detect the original document by performing an original document detection process corresponding to a detection state using the opening-closing sensor 12.

In addition, the images from the front surface and the rear surface in the original document region may be magnified in the printing image. For example, the images from the front surface and the rear surface in the original document region may be arranged in the printing image after being magnified using a magnification which is designated by a user. In addition, a printing image may be generated by magnifying the images from the front surface and the rear surface to each fit in an entire region of a half of the sheet, respectively.

In addition, positions at which the images from the front surface and the rear surface in the original document region are disposed are not limited to the positions (center in upper half and center in lower half) illustrated in FIG. 5. For example, the images from the front surface and the rear surface may be disposed at positions which are designated by a user.

Subsequently, an operation example of both side disposition copying will be illustrated.

Figure 6:
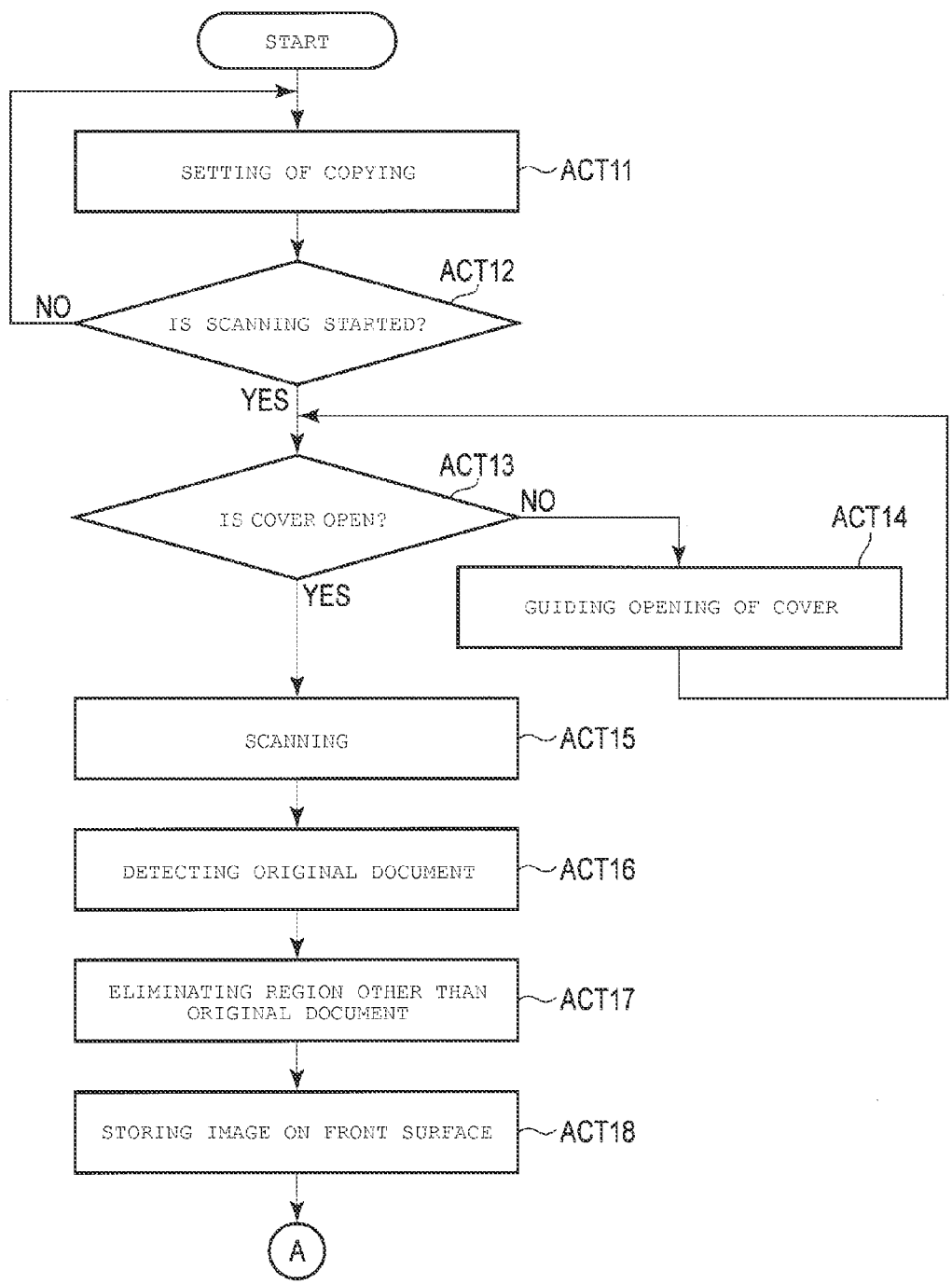
FIG. 6 is a flowchart which illustrates an example sequence of operations for both side disposition copying in the digital multi-functional peripheral.
Figure 7:
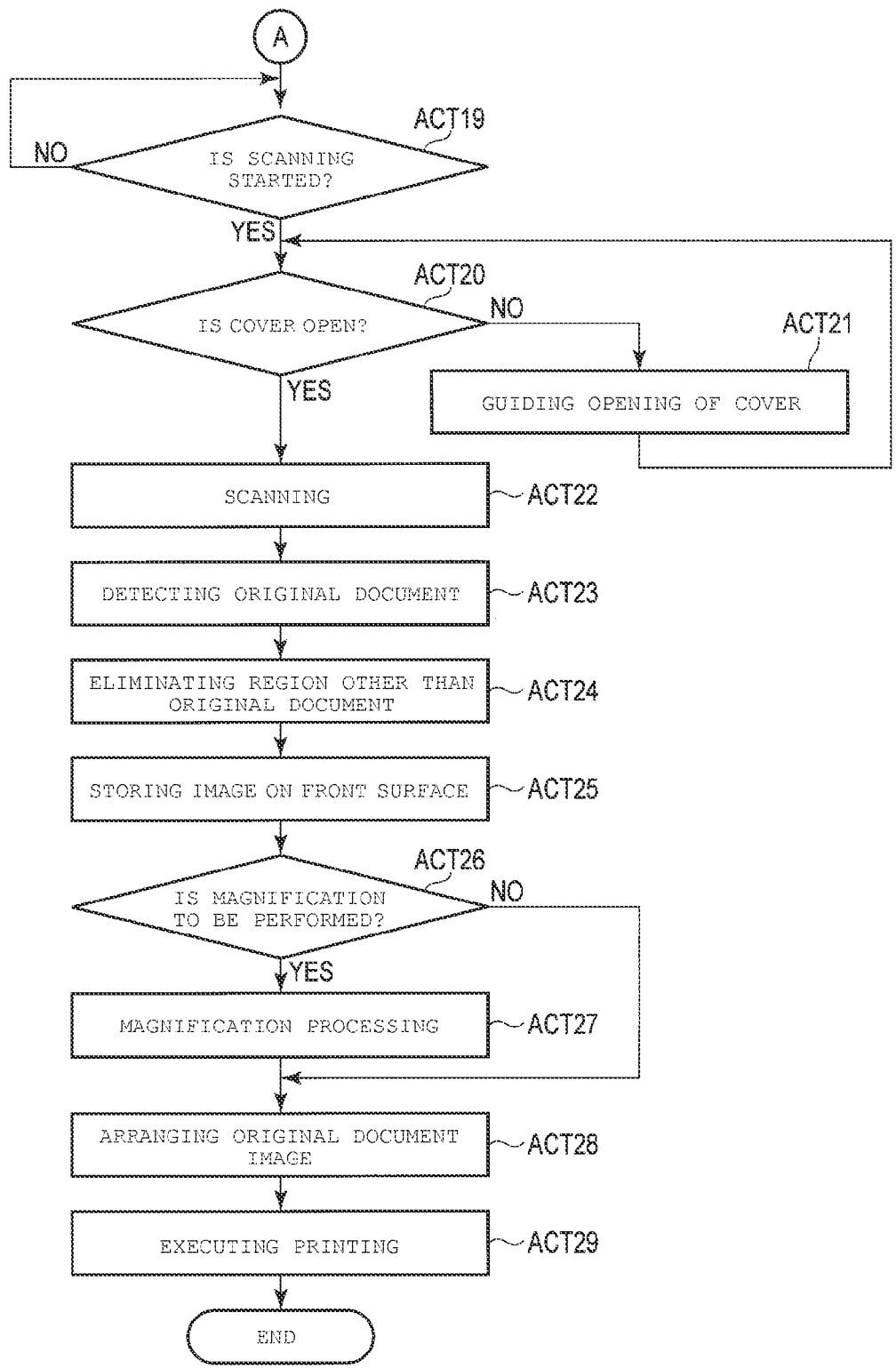
FIG. 7 is a flowchart which illustrates another example sequence of operations for both side disposition copying in the digital multi-functional peripheral.

FIGS. 6 and 7 are flowcharts which illustrate example sequences of operations for both side disposition copying in the digital multi-functional peripheral.

When executing the both side disposition copying, a user selects the function of the both side disposition copying (may be referred to as card copying) using the operation unit 4b of the operation panel 4. The CPU 51 of the system control unit 5 sets the both side disposition copying according to an input to the operation unit 4b. In addition, the CPU 51 may receive various copying settings corresponding to inputs to the operation unit 4b (ACT 11).

For example, the CPU 51 may receive setting of an image quality, setting of a sheet size or type, setting of disposition of an original document image, setting of a magnification, and the like, according to an operation with respect to the operation unit 4b. As the setting of disposition of the original document image, a disposition in which an image from the front surface and an image from the rear surface of the original document are horizontally arranged in line may be set. In addition, as the setting of disposition of the original document, a disposition in which the image from the front surface and the image from the rear surface of the original document are vertically or horizontally arranged continuously may be set.

In addition, as the setting of magnification, respective magnifications may be set with respect to the image from the front surface and the image from the rear surface. In addition, as the setting of magnification, a disposition may be set in which the image from the front surface and the image from the rear surface are each fitted to one half of the entire region of a sheet, respectively. For example, when the size of the original document is smaller than a half size of a sheet, the magnification unit 64e may enlarge the image from the front surface and the image from the rear surface of the original document so as to be the half size of the sheet, respectively. In addition, when the size of the original document is larger than the half size of the sheet, the magnification unit 64e may contract the image from the front surface and the image from the rear surface of the original document so as to be half of the size of the sheet, respectively.

After receiving the instruction for the both side disposition copying, the CPU 51 receives an instruction for a start of scanning using the operation unit 4b (ACT 12). When the start of scanning is instructed (Yes in ACT 12), the CPU 51 determines whether the ADF 13 (platen cover) is in an open state using a detection signal of the opening-closing sensor 12 (ACT 13). When it is determined that the platen cover is not in the open state (No in ACT 13), the CPU 51 displays a guiding screen which guides a user so as to open the ADF 13 (platen cover) on the display unit 4a (ACT 14).

In addition, when it is possible to detect the original document even in a state in which the platen cover is closed, processes in ACTS 13 and 14 may be omitted.

When it is determined that the ADF 13 as the platen cover is in the open state (Yes in ACT 13), the CPU 51 starts a reading process of an image using the image reading unit 10 (ACT 15). A user places the original document at an arbitrary position on the original document table glass 11 (arbitrary position in range for reading) so that the front surface of the original document becomes a surface for reading. When the front surface of the original document is present on the original document table glass 11 so as to be the surface for reading, the image reading unit 10 generates a read image which includes the image on the front surface of the original document. In addition, when the ADF 13 is in the open state, the image reading unit 10 reads a region other than the original document as an image with low luminance.

When the image reading unit 10 obtains the read image, the original document detection unit 64c detects the original document region in the image which is read using the image reading unit 10 (ACT 16). When the original document region is detected, the outside region eliminating unit 64d extracts an image only in the original document region by eliminating the region other than the original document (ACT 17). In ACT 17, since it is assumed that an image from the front surface of the original document is to be read, the outside region eliminating unit 64d extracts the image of the front surface of the original document. The image memory 65 stores only the image from the front surface of the original document region which is obtained by eliminating the region other than the original document (ACT 18).

After scanning the image of the front surface of the original document, the CPU 51 enters a state of waiting for an instruction on scanning of an image including the rear surface of the original document (ACT 19). That is, when starting of scanning is instructed again, after scanning the image of the front surface of the original document (Yes in ACT 19), the CPU 51 determines whether the ADF 13 (platen cover) is in the open state again due to a detection signal of the opening-closing sensor 12 (ACT 20). When it is determined that the platen cover is not in the open state (No in ACT 20), the CPU 51 displays a guiding screen which guides a user to open the ADF 13 (platen cover) on the display unit 4a (ACT 21).

When it is determined that the platen cover of the ADF 13 as is in the open state (Yes in ACT 20), the CPU 51 starts the reading process of an image using the image reading unit 10 (ACT 22). At this time, the original document is placed so that the rear surface of the original document becomes a surface for reading at an arbitrary position of the original document table glass 11 (arbitrary position in range for reading). When the rear surface of the original document is present on the original document table glass 11 so as to be the surface for reading, the image reading unit 10 generates a read image including the image on the front surface of the original document. In addition, when the ADF 13 is in the open state, the image reading unit 10 reads the region other than the original document as an image with low luminance.

When the image reading unit 10 obtains the read image, the original document detection unit 64c detects the original document region in the image which is read using the image reading unit 10 (ACT 23). When the original document region is detected, the outside region eliminating unit 64d extracts an image only in the original document region by eliminating the region other than the original document (ACT 24). In ACT 24, since it is assumed that an image including the image on the rear surface of the original document is obtained, the outside region eliminating unit 64d extracts the image on the rear surface of the original document. The image memory 65 stores the image of the rear surface in the original document region from which the region other than the original document is eliminated (ACT 18).

In addition, when magnifications are set with respect to the images from the front surface and the rear surface of the original document (Yes in ACT 26), the CPU 51 instructs the magnification unit 64e to set magnification rates with respect to the images from the front surface and the rear surface of the original document (ACT 27). The magnification unit 64e magnifies the images from the front surface and the rear surface of the original document using the magnification rates which are designated by the CPU 51 (ACT 27). In addition, when the magnification rate is not set (No in ACT 26), the process in ACT 27 is omitted.

For example, when causing the image from the front surface of the original document to be fit in the half of the entire region of the sheet, the CPU 51 calculates a magnification rate with respect to the front surface image using a size of the extracted image on the front surface, and a half size of the sheet. In addition, when causing the image from the rear surface of the original document to be fit in the half of the entire region of the sheet, the CPU 51 calculates a magnification rate with respect to the rear surface image using a size of the extracted image from the rear surface, and a half size of the sheet. The magnification unit 64e magnifies the images from the front surface and the rear surface of the original document using the magnification rate which is designated by the CPU 51.

When processes up to ACT 27 are finished, the image editing unit 64f generates a printing image in which the images from the front surface and the rear surface of the original document are disposed (ACT 28). For example, the image editing unit 64f arranges the image from the front surface of the original document at a center in the upper half region of the printing image, and disposes the image from the rear surface at a center in the lower half region of the printing image. The output image processing unit 64 outputs the printing image which is generated by the image editing unit 64f to the printer 2. After receiving the printing image, the printer 2 prints the printing image on a sheet (ACT 29).

As described above, the image forming apparatus according to the embodiment includes the image reading unit, the image processing unit, and the image forming unit. The image reading unit reads an image including the front surface of the original document. The image processing unit extracts an image region of the front surface of the original document by performing a process of detecting the original document, and a process of eliminating a region other than the original document. In addition, the image reading unit reads an image including the rear surface of the original document. The image processing unit extracts an image region of the rear surface of the original document by performing the process of detecting the original document, and the process of eliminating a region other than the original document. The image processing unit generates a printing image in which images from the front surface and the rear surface of the original document are disposed so as to be fit in a single side of one sheet. The image forming unit prints the printing image on the sheet.

In this manner, the image forming apparatus according to the embodiment may execute a process of printing both sides of the original document by putting both sides together on a single side of one sheet. For example, in both side disposition copying of the image forming apparatus according to the embodiment, it is not necessary for a user to input a size of the original document, or to consider a position of the original document on the original document table.

In addition, the image forming apparatus according to the embodiment may designate disposition positions of the front surface and the rear surface of the original document. In this manner, the image forming apparatus according to the embodiment may also execute both side disposition copying corresponding to an intention of a user, in addition to disposing an image at a predetermined position. In addition, the image forming apparatus according to the embodiment may designate magnifications with respect to the front surface and the rear surface of the original document. In this manner, it is also possible to execute both side disposition copying corresponding to an intention of a user, in addition to disposing an image in a predetermined size.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
   a scanner configured to generate image data by reading a region including a first surface of an original document and a region including a second surface of the original document, respectively, in a state in which regions other than the first and second surfaces of the document are respectively read with low luminance;
   a processor configured to:
   determine, from a first image data which was generated by the scanner reading a first surface of the original document, a region other than a first document region corresponding to the first surface of the original document using a difference in luminance in the first image data, wherein a region with low luminance in the first image data is determined to be the region other than the first document region,
   eliminate the region other than the first document region from the first image data,
   determine, from a second image data which was generated by the scanner reading a second surface of the original document, a region other than a second document region corresponding to the second surface of the original document using a difference in luminance in the second image data, wherein a region with low luminance in the second image data is determined to be the region other than the second document region,
   eliminate the region other than the second document region from the second image data, and
   generate, for printing on a single surface of a recording medium, a printing image including: the first read image with the region other than the first document region eliminated, and the second read image with the region other than the second document region eliminated; and
   a printer configured to print the generated printing image on a single surface of a recording medium.

2. The apparatus according to claim 1, wherein the scanner reads the region including the first surface of the original document, and the region including the second surface of the original document, respectively, in a state in which a platen cover is open.

3. The apparatus according to claim 1, wherein the processor is further configured to detect an edge position of the first document region from the first image data, and determines the region other than the first document region further using the detected edge position of the first document region.

4. The apparatus according to claim 1, wherein the processor generates the printing image in which the first read image with the region other than the first document region eliminated and the second read image with the region other than the second document region eliminated are disposed according to respective designated disposition positions.

5. The apparatus according to claim 4, wherein the respective disposition positions are designated by a user.

6. The apparatus according to claim 1,
wherein the processor generates the printing image in which the first read image with the region other than the first document region eliminated and the second read image with the region other than the second document region eliminated are respectively disposed at designated magnifications.

7. The apparatus according to claim 6,
wherein the respective magnifications are designated by a user.

8. An image forming method comprising the steps of:
generating a first image data by reading a region including a first surface of an original document in a state in which a region other than the first surface of the document is read with low luminance;
determining, from the first image data, a region other than a first document region corresponding to the first surface of the original document using a difference in luminance in the first image data, wherein a region with low luminance in the first image data is determined to be the region other than the first document region,
eliminating, from the first image data the region other than the first document region corresponding to the first surface of the original document;
generating a second image data by reading a region including a second surface of the original document in a state in which a region other than the second surface of the document is read with low luminance;
determining, from the second image data, a region other than a second document region corresponding to the second surface of the original document using a difference in luminance in the second image data, wherein a region with low luminance in the second image data is determined to be the region other than the second document region,
eliminating, from the second image data a region other than a second document region corresponding to the second surface of the original document;
generating, for printing on a single surface of a recording medium, a printing image including: the first read image with the region other than the first document region eliminated, and the second read image with the region other than the second document region eliminated; and
printing the generated printing image on a single surface of a recording medium.

9. The method according to claim 8,
wherein the region including the first surface of the original document is read in a state in which a platen cover is open.

10. The method according to claim 8, further comprising:
detecting an edge position of the first document region from the first image data,
wherein the region other than the first document region is detected further using the detected edge position of the first document region.

11. The method according to claim 8,
the printing image is generated so that the first read image with the region other than the first document region eliminated and the second read image with the region other than the second document region eliminated are disposed according to respective designated disposition positions.

12. The method according to claim 11, wherein the respective disposition positions are designated by a user.

13. The method according to claim 8,
the printing image is generated so that the first read image with the region other than the first document region eliminated and the second read image with the region other than the second document region eliminated are respectively disposed at designated magnifications.

14. The method according to claim 13,
wherein the respective magnifications are designated by a user.

15. A non-transitory recording medium in which a program for image forming which may be executed by a processor is stored, the program causing the processor to execute:
generating a first image data by reading a region including a first surface of an original document in a state in which a region other than the first surface of the document is read with low luminance;
determining, from the first image data, a region other than a first document region corresponding to the first surface of the original document using a difference in luminance in the first image data, wherein a region with low luminance in the first image data is determined to be the region other than the first document region,
eliminating, from the first image data the region other than the first document region corresponding to the first surface of the original document;
generating a second image data by reading a region including a second surface of the original document in a state in which a region other than the second surface of the document is read with low luminance;
determining, from the second image data, a region other than a second document region corresponding to the second surface of the original document using a difference in luminance in the second image data, wherein a region with low luminance in the second image data is determined to be the region other than the second document region,
eliminating, from the second image data a region other than a second document region corresponding to the second surface of the original document;
generating, for printing on a single surface of a recording medium, a printing image including: the first read image with the region other than the first document region eliminated, and the second read image with the region other than the second document region eliminated; and
printing the generated printing image on a single surface of a recording medium.

16. The non-transitory recording medium according to claim 15, wherein the region other than the first document region is further determined using a detected edge position of the first document region.

* * * * *